United States Patent
Nam et al.

(10) Patent No.: US 8,144,390 B2
(45) Date of Patent: Mar. 27, 2012

(54) APPARATUS AND METHOD FOR 2D AND 3D IMAGE SWITCHABLE DISPLAY

(75) Inventors: Dong Kyung Nam, Yongin-si (KR); Gee Young Sung, Yongin-si (KR); Yun Tae Kim, Yongin-si (KR); Ju Yong Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 251 days.

(21) Appl. No.: 12/382,684

(22) Filed: Mar. 20, 2009

(65) Prior Publication Data

US 2010/0091354 A1   Apr. 15, 2010

(30) Foreign Application Priority Data

Oct. 9, 2008   (KR) .................. 10-2008-0099020

(51) Int. Cl.
*G02B 26/08* (2006.01)
(52) U.S. Cl. ....................................... 359/298
(58) Field of Classification Search .............. 359/298; 348/51–57
See application file for complete search history.

(56) References Cited

U.S. PATENT DOCUMENTS

| | | | |
|---|---|---|---|
| 5,897,184 A * | 4/1999 | Eichenlaub et al. | 349/64 |
| 6,157,424 A | 12/2000 | Eichenlaub | |
| 2006/0176557 A1 | 8/2006 | Travis et al. | |
| 2006/0244918 A1 * | 11/2006 | Cossairt et al. | 353/7 |
| 2008/0252971 A1 * | 10/2008 | Lee et al. | 359/463 |

FOREIGN PATENT DOCUMENTS

| | | |
|---|---|---|
| JP | 07-133893 | 5/1995 |
| JP | 08-149520 | 6/1996 |
| JP | 09-102969 | 4/1997 |
| JP | 10-268805 | 10/1998 |
| JP | 2001-091896 | 4/2001 |
| JP | 3192298 | 5/2001 |
| JP | 2001-330713 | 11/2001 |
| KR | 10-2006-0056356 | 5/2006 |
| KR | 10-2006-0096596 | 9/2006 |
| KR | 10-2006-0114694 | 11/2006 |
| KR | 10-2007-0001069 | 1/2007 |
| KR | 10-2007-0013498 | 1/2007 |

* cited by examiner

*Primary Examiner* — Scott J Sugarman
*Assistant Examiner* — Vipin Patel
(74) *Attorney, Agent, or Firm* — Staas & Halsey LLP (57) ABSTRACT

An image display apparatus and method are disclosed. The image display apparatus includes a light source unit to include at least one light source, an optical unit to generate a directional light using a light projected from the light source unit, a variable diffuser unit to control diffusion of the directional light, a pixel unit to selectively generate one of two-dimensional (2D) images and three-dimensional (3D) images to correspond to the control of the variable diffuser unit, and a vertical diffusion unit to diffuse the 3D images in a vertical direction.

21 Claims, 10 Drawing Sheets

APPARATUS AND METHOD FOR 2D AND 3D IMAGE SWITCHABLE DISPLAY

CROSS-REFERENCE TO RELATED APPLICATIONS

This application claims the benefit of Korean Patent Application No. 10-2008-0099020, filed on Oct. 9, 2008, in the Korean Intellectual Property Office, the disclosure of which is incorporated herein by reference.

BACKGROUND

1. Field

Example embodiments of the present disclosure relate to an image display apparatus for switching displays of two dimensional (2D) images and three dimensional (3D) images with each other, and more particularly, to a technique in which a directional light is transmitted or diffused using a variable diffuser to perform switching of 2D and 3D images.

2. Description of the Related Art

To enable a user to view three dimensional (3D) images without wearing glasses, a display through which different images are viewed depending on a location of eyes of the user may be desirable. An auto stereoscopic display may be provided as a representative technique for implementing such a display.

In this instance, a method for using more than two left/right images so as to widen an optimum viewing region of the auto stereoscopic display is referred to as a multi-view display. In the multi-view display, a more widened optimum viewing region may be obtained along with an increase in a number of images. In implementing the multi-view display, when using a parallax barrier scheme, brightness of a screen may be reduced in proportion to the number of images. Thus, a lenticular lens scheme in which the brightness of the screen is not changed regardless of the number of images may generally be used.

However, when using the lenticular lens scheme, it is difficult to implement 2D images of a maximum panel resolution easily due to a physical structure of the lenticular lens, unlike the parallax barrier scheme.

In order to overcome this problem, a technique for switching a 2D/3D image display to improve effects of the lenticular lens by changing a refractive index of the lens has been suggested. However, such a technique for changing the refractive index of the lens may have a disadvantage in that characteristics of the lens may greatly affect image quality.

Accordingly, there is a need for a technique for switching a 2D/3D image display that may overcome limitations of existing techniques for switching the 2D/3D image display, and for implementing a lens having excellent image quality and high precision without changing a shape of the lens.

SUMMARY

One or more example embodiments may provide an image display apparatus and method which may use a precise lens without changing a shape of the lens, and display 2D or 3D images using a variable diffuser, thereby reducing deterioration in image qualities of the 2D and 3D images, and outputting high quality images.

One or more example embodiments may also provide an image display apparatus and method that may use an easily-manufactured variable diffuser, thereby increasing mass-productivity of a system and reducing costs.

Additional aspects and/or advantages will be set forth in part in the description which follows and, in part, will be apparent from the description, or may be learned by practice of the example embodiments.

According to example embodiments, an image display apparatus may be provided. The image display apparatus may include a light source unit to include at least one light source, an optical unit to generate a directional light using a light projected from the light source unit, a variable diffuser unit to control diffusion of the directional light, a pixel unit to selectively generate one of two-dimensional (2D) images and three-dimensional (3D) images to correspond to the control of the variable diffuser unit, and a vertical diffusion unit to diffuse the 3D images in a vertical direction.

In this instance, the optical unit may include a parallel beam-generation unit to change the light projected from the light source unit into parallel beams, and a directional light-generation unit to generate a directional light for generating 3D images. The optical unit may be positioned between the light source unit and the pixel unit.

Also, the parallel beam-generation unit may include a lens to change the light projected from the light source unit into first parallel beams, and a light collimation unit to change the first parallel beams into second parallel beams.

According to another example embodiments, an image display apparatus may be provided. The image display apparatus may include a light source unit to include at least one light source, an optical unit to generate a directional light using a light projected from the light source unit, a pixel unit to generate images using the directional light, a variable diffuser unit to control diffusion of the images generated on the pixel unit, and a vertical diffusion unit to diffuse the images in a vertical direction.

In this instance, the variable diffuser unit may be positioned at an opposite side of the light source, and selectively vary the variable diffuser to be in one of a transparent state and a diffusing state depending on a presence/absence of a power to thereby selectively transmit and diffuse the images generated on the pixel unit.

According to still another example embodiments, there may be provided an image display method, including: generating a directional light using a light projected from a light source, selectively transmitting and diffusing the directional light to generate one of 2D images and 3D images, and diffusing the 3D images in a vertical direction.

According to yet another example embodiments, there may be provided an image display method, including: determining whether a 3D mode is selected, determining whether contents support the 3D mode, generating 3D images using a light projected from a light source when the 3D mode is selected and the contents support the 3D mode, displaying the 3D images on an image panel, and changing a variable diffuser to be in a transparent state to generate 3D images, the variable diffuser being selectively changeable to be in one of the transparent state and a diffusing state.

In this instance, the image display method may further include: removing non-uniformity in brightness of the 2D images, when a 2D mode is selected or the contents do not support the 3D mode, displaying the 2D images on the image panel, and changing the variable diffuser to be in the diffusing state to generate the 2D images. Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Hereinafter, example embodiments of the present disclosure will be described in detail with reference to drawings.

Figure 1:
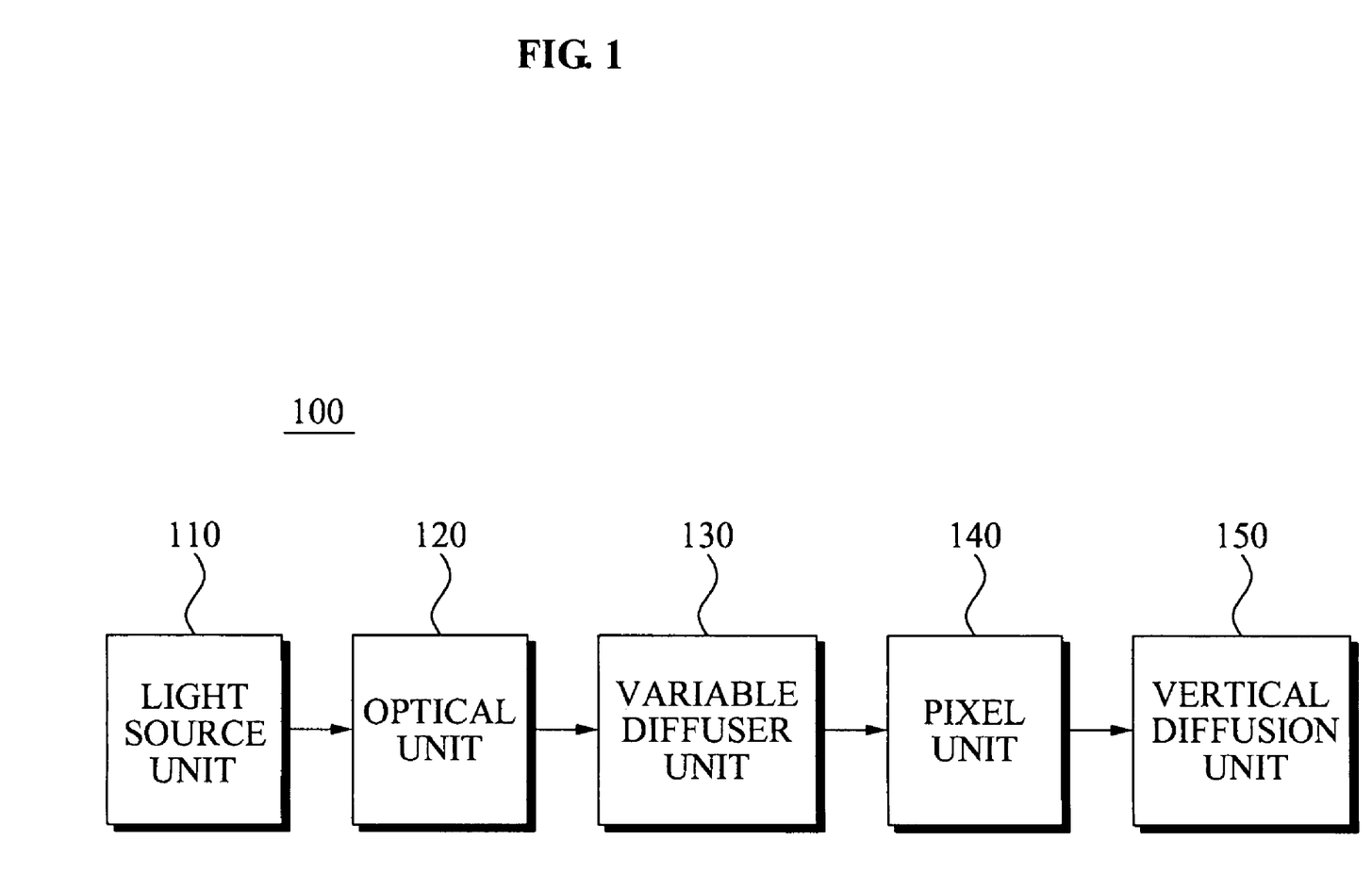
FIG. 1 is a diagram illustrating an image display apparatus according to an example embodiment.

FIG. 1 is a diagram illustrating an image display apparatus 100 according to an example embodiment. Referring to FIG. 1, the image display apparatus 100 according to the example embodiment may include, for example, a light source unit 110, an optical unit 120, a variable diffuser unit 130, a pixel unit 140, and a vertical diffusion unit 150. Also, the image display apparatus 100 may further include a field stop filter (not shown). Also, the image display apparatus 100 may further include a high-speed switching control unit (not shown).

The light source unit 110 may project basic beams used for displaying pixel information, and may include at least one light source. Also, the light source may be inversely located on any location of the image display apparatus, for example a front surface side and side surface side of an image panel.

The optical unit 120 may generate a directional light using a light projected from the light source. In this instance, the optical unit 120 may include a parallel beam-generation unit (not shown) to change the light projected from the light source unit into parallel beams, and a directional light-generation unit (not shown) to generate a directional light for generating 3D images.

The parallel beam-generation unit may change the light projected from the light source into parallel beams. For example, a light radially projected from the light source for the purpose of generating parallel beams may be first changed into parallel beams via a Fresnel lens, and may be further changed into more parallel beams through a light collimation unit.

The directional light-generation unit may generate a directional light for generating 3D images. For example, the parallel beams generated in the parallel beam-generation unit may be changed into the directional light having directivity using a lenticular lens.

The variable diffuser unit 130 may control diffusion of the directional light. In this instance, the control of the diffusion may be performed such that power is applied to a variable diffuser, and a state of the variable diffuser is controlled to be in a transparent state or a diffusing state. When in the transparent state, the directional light may be directly transmitted to display 3D images, and when in the diffusing state, the directional light may be totally diffused to display 2D images.

The pixel unit 140 may generate 2D or 3D images that correspond to the control of the variable diffuser unit 130. Specifically, 3D images may be generated when the state of the variable diffuser is in the transparent state according to the control of the variable diffuser unit 130, and 2D images may be generated when in the diffusing state.

The vertical diffusion unit 150 may diffuse the 3D images in a vertical direction. Specifically, a diffusion light may be generated in the vertical direction and a directional light may be generated in a horizontal direction to thereby output 3D images, when the state of the variable diffuser is in the transparent state.

In a case where the lenticular lens is used in the optical unit 120, the field stop filter (not shown) may be located at a focus of the lens, and may block a light that does not pass through the focus of the lens. By using the field stop filter 150, a more precise directional light may be generated.

The high-speed switching control unit (not shown) may high-speed switch the variable diffuser to control the 2D images and the 3D images to be simultaneously output.

As described above, a screen capable of changing diffusion characteristics without changing lenses may be arranged to selectively display 2D images and 3D images, thereby implementing a lens having greater precision and displaying high quality 2D and 3D images. Also, the variable diffuser may be easily manufactured, thereby enhancing mass productivity of a system and reducing costs.

Figure 2:
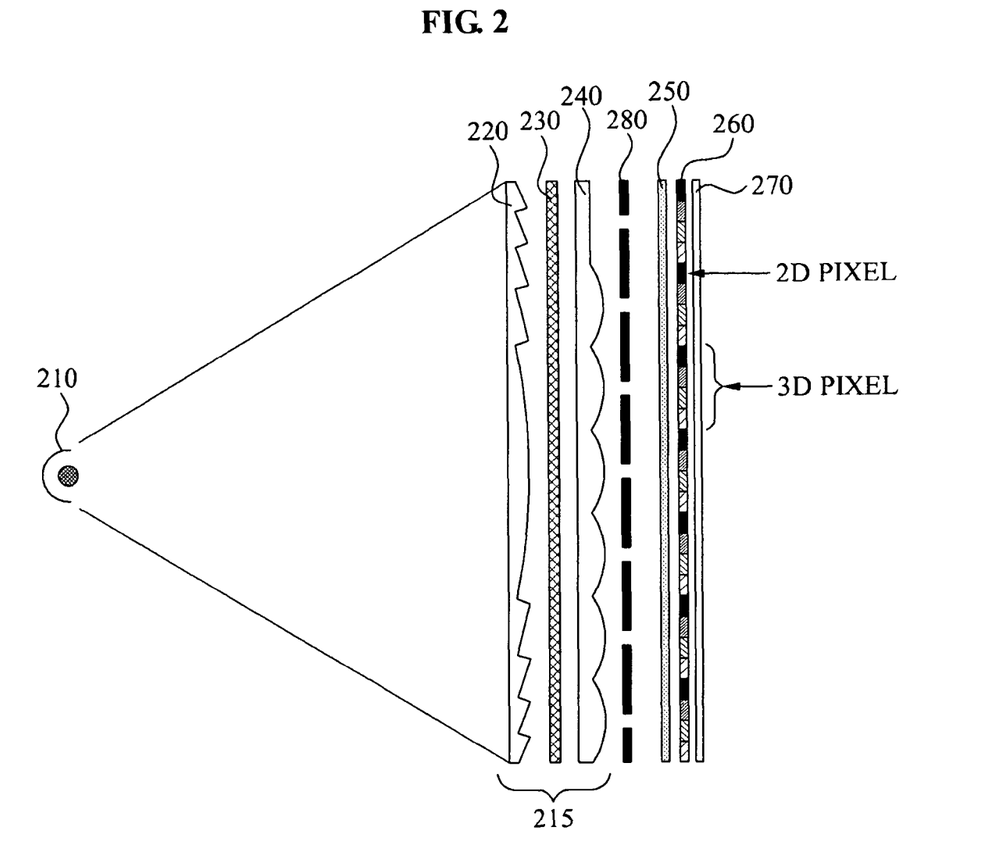
FIG. 2 is a diagram illustrating a detailed configuration of an image display apparatus according to an example embodiment.

FIG. 2 is a diagram illustrating a detailed configuration of an image display apparatus according to an example embodiment.

Referring to FIG. 2, the image display apparatus may include, for example, a light source unit 210, optical units 215, a variable diffuser unit 250, a pixel unit 260, a vertical diffusion unit 270, and a field stop filter 280.

The light source unit 210 may include at least one light source, and light sources such as a metal halide lamp, a Light Emitting Diode (LED), a Cold Cathode Fluorescent Lamp (CCFL), and the like may be used as a white light source for a general projection display. Also, a location of the light source may be arranged on a front surface of a panel as shown in FIG. 2, and also may be arranged on other locations such as a side surface of the panel.

The optical units 215 may include parallel beam-generation units 220 and 230, and a directional light-generation unit 240.

The parallel beam-generation units 220 and 230 may include a lens to change a light radially projected from the light source into first parallel beams, and a light collimation unit to change the first parallel beams into second parallel beams. The lens and the light collimation unit may be comprised of a Fresnel lens and a light collimator.

Here, the Fresnel lens may be used for guiding light beams to become parallel. Optical glasses such as a crown glass, a flint glass, and the like, and optical plastics such as acrylic, polymethyl methacrylate (PMMA), and the like, may be used as the Fresnel lens. The light collimator may be an optical film for changing the first parallel beams into the second parallel beams, and permitting only parallel beams to pass through the optical film. In this instance, the second parallel beams are more parallel than the first parallel beams.

The directional light-generation unit 240 may generate a directional light for generating 3D images by refracting the second parallel beams. Here, the directional light-generation unit 240 may use a lenticular lens. The lenticular lens may be fabricated using an optical glass such as the Fresnel lens and an optical plastic, and may be selected according to characteristics of a refractive index.

The variable diffuser unit 250 may control diffusion of the directional light based on 2D images or 3D images to generate the 2D images or the 3D images. In this instance, when the 3D images are intended to be output, a power may be applied to a variable diffuser to change the variable diffuser to a transparent state. In contrast, when the 2D images are intended to be output, the power may not be applied to the variable diffuser to change the variable diffuser to a diffusing state. Specifically, the variable diffuser may be changed to be in the transparent state or the diffusing state according to a presence/absence of power and a polymer-dispersed liquid crystal (PDLC) may be used as the variable diffuser.

The pixel unit 260 may generate 3D images or 2D images to correspond to the control of the variable diffuser unit 250. Specifically, the directional light may be directly transmitted or diffused according to the state of the variable diffuser, thereby generating the 2D images and the 3D images while passing through the pixel unit 260.

When the variable diffuser is changed to be in the transparent state, and the directional light is transmitted, the vertical diffusion unit 270 may diffuse the transmitted directional light in a vertical direction to thereby generate diffusion light in the vertical direction, and directional light in a horizontal direction. In this instance, a vertical diffusion screen may be a film having diffusion characteristics only in a vertical direction, and may be comprised of holographic optical elements (HOEs).

The field stop filter 280 may be located at a focus of the lens of the directional light-generation unit 240, and block a light that does not pass through the focus of the lens. As a result, more precise directional light may be obtained.

Figure 3:
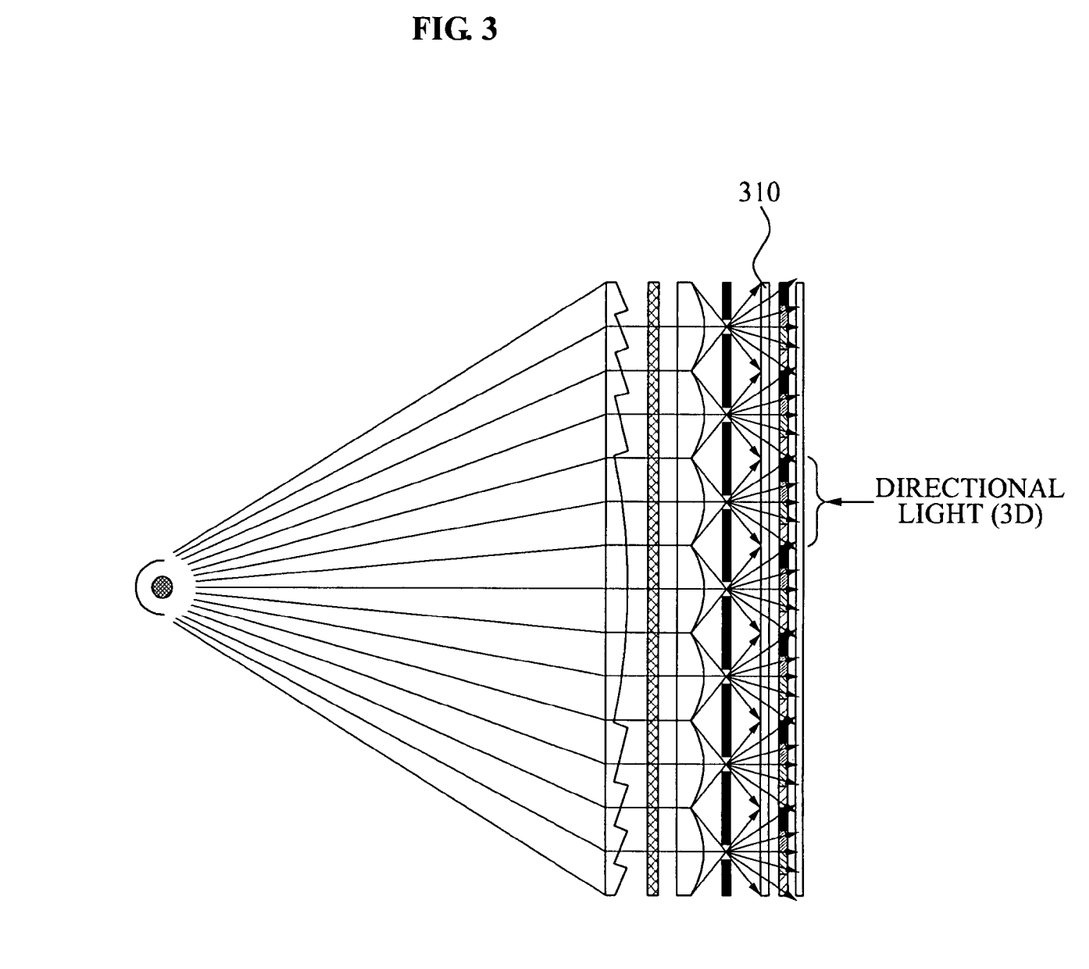
FIG. 3 is a diagram illustrating three dimensional (3D) image display operations of the image display apparatus of FIG. 2.
Figure 4:
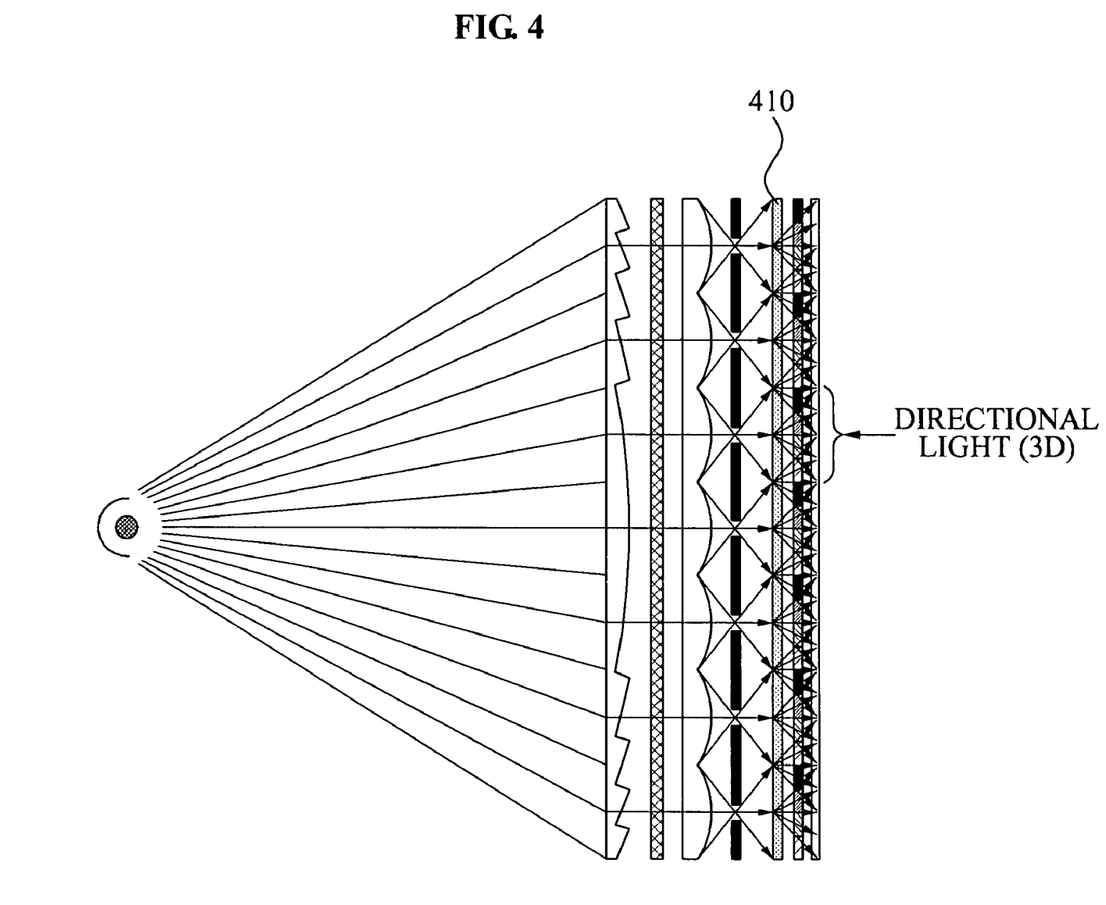
FIG. 4 is a diagram illustrating two dimensional (2D) image display operations of the image display apparatus of FIG. 2.

FIG. 3 is a diagram illustrating three dimensional (3D) image display operations of the image display apparatus of FIG. 2, and FIG. 4 is a diagram illustrating 2D image display operations of the image display apparatus of FIG. 2.

Referring to FIG. 3, a light generated in a light source for the purpose of generating 3D images may be changed into parallel beams via the Fresnel lens and a light collimation unit. The parallel beams may then be changed into a directional light via the lenticular lens and the field stop filter. In this case, a light may be transmitted via a variable diffuser 310 that is in the transparent state, and stereo-images or multi-view images may be generated by the pixel unit. Then, the diffusion light and directional light may be respectively generated in a vertical direction and horizontal direction by the vertical diffusion screen. Accordingly, in this case, a user may view 3D images.

Referring to FIG. 4, a variable diffuser 410 may be changed to be in a diffusing state so as to output 2D images, and a light having no directivity may be generated by totally diffusing an incident light. In this instance, the pixel unit may display 2D images, and accordingly the user may view 2D images. The vertical diffusion screen may diffuse the light only in the vertical direction, and may not perform any function because the light has been already totally diffused.

Figure 5:
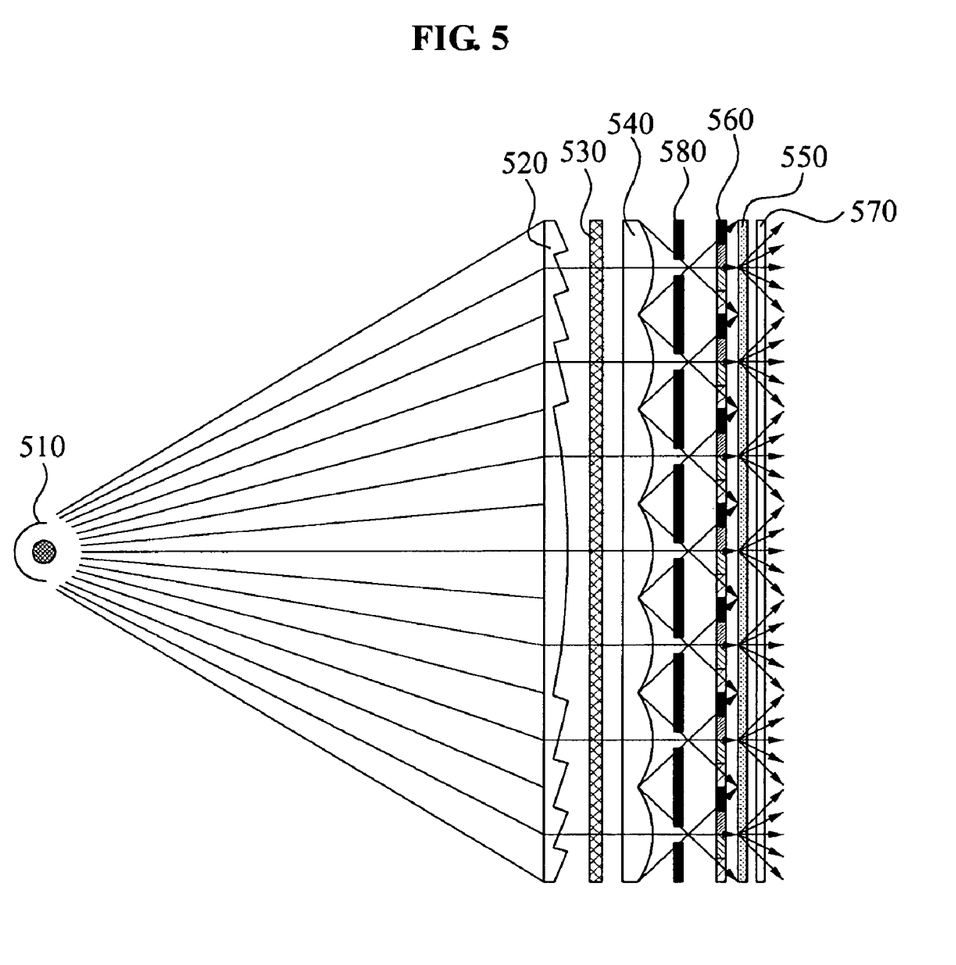
FIG. 5 is a diagram illustrating a detailed configuration of an image display apparatus according to another example embodiment.

FIG. 5 is a diagram illustrating a detailed configuration of an image display apparatus according to another example embodiment.

Referring to FIG. 5, the image display apparatus may include, for example, a light source unit 510, optical units 520, 530, and 540, a pixel unit 560, a variable diffuser 550, a vertical diffusion unit 570, and a field stop filter 580.

The pixel unit 560 may generate images using a directional light generated in the optical units 520, 530, and 540. The variable diffuser 550 may control diffusion of the images generated in the pixel unit 560.

Here, a principle for shifting and outputting 2D images and 3D images may be similar to that illustrated in FIG. 2. However, a location where images are generated may be moved forward to the location where the variable diffuser is positioned, in contrast with the location illustrated in FIG. 2.

As described above, locations of the pixel unit 560 and the variable diffuser 560 may be interchanged with each other, and may have similar results to those in FIG. 2.

Figure 6:
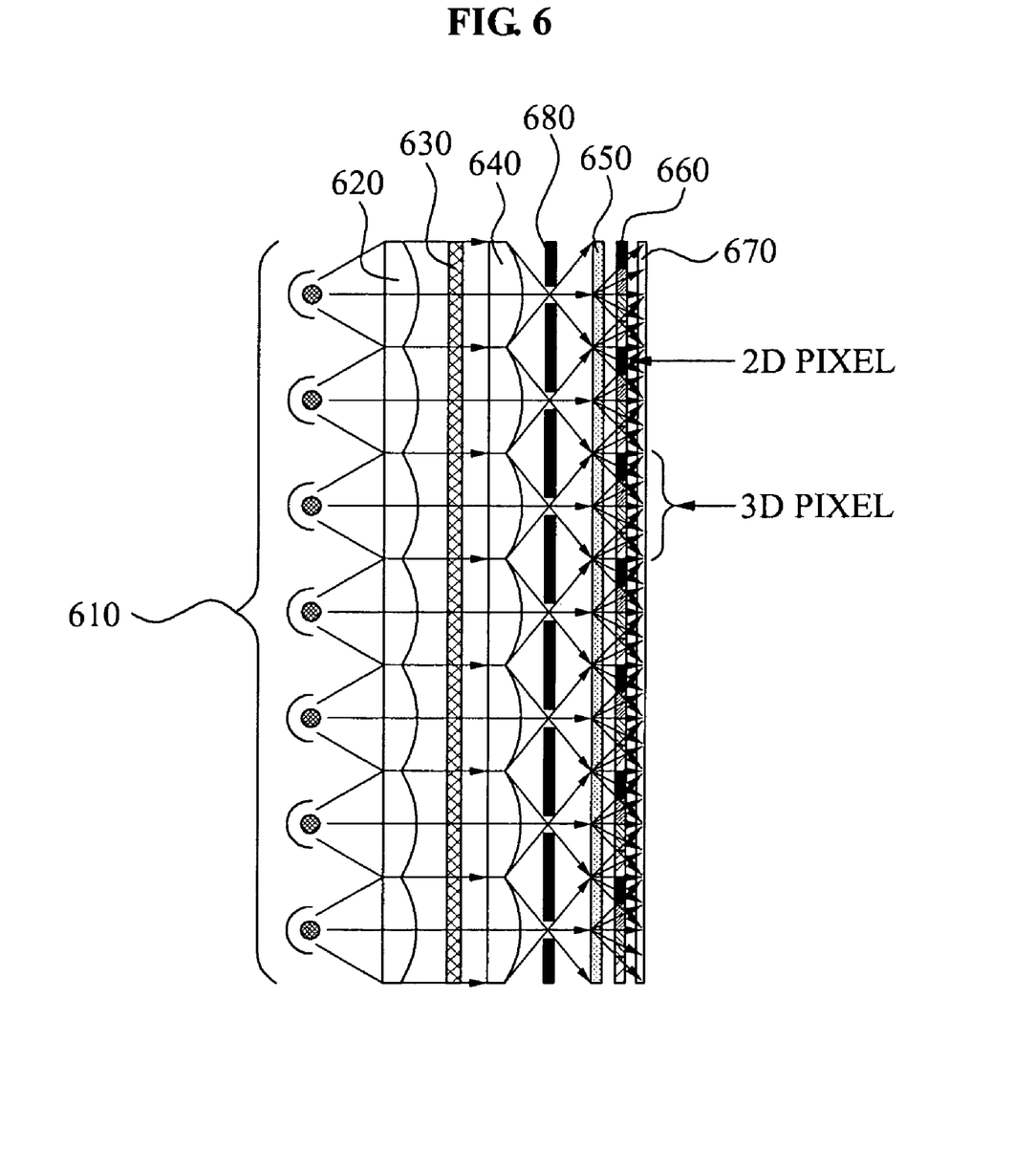
FIG. 6 is a diagram illustrating a detailed configuration of an image display apparatus according to still another example embodiment.

FIG. 6 is a diagram illustrating a detailed configuration of an image display apparatus according to still another example embodiment. Specifically, an example of the image display apparatus capable of shifting 2D images and 3D images when having a plurality of light sources 610 is illustrated in FIG. 6.

Here, the image display apparatus may include, for example, a plurality of light sources 610, a collimation lens 620 for generating parallel beams, a light collimation unit 630, a lenticular lens 640, a field stop filter 680, a variable diffuser 650, a pixel unit 660, and a vertical diffusion unit 670.

Specifically, when using the plurality of light sources, the collimation lens 620 may be used instead of the Fresnel lens. Here, the collimation lens 620 may function to generate parallel beams and may be implemented by the lenticular lens 640. In this case, locations of the variable diffuser 650 and the pixel unit 660 may be interchanged with each other.

Figure 7:
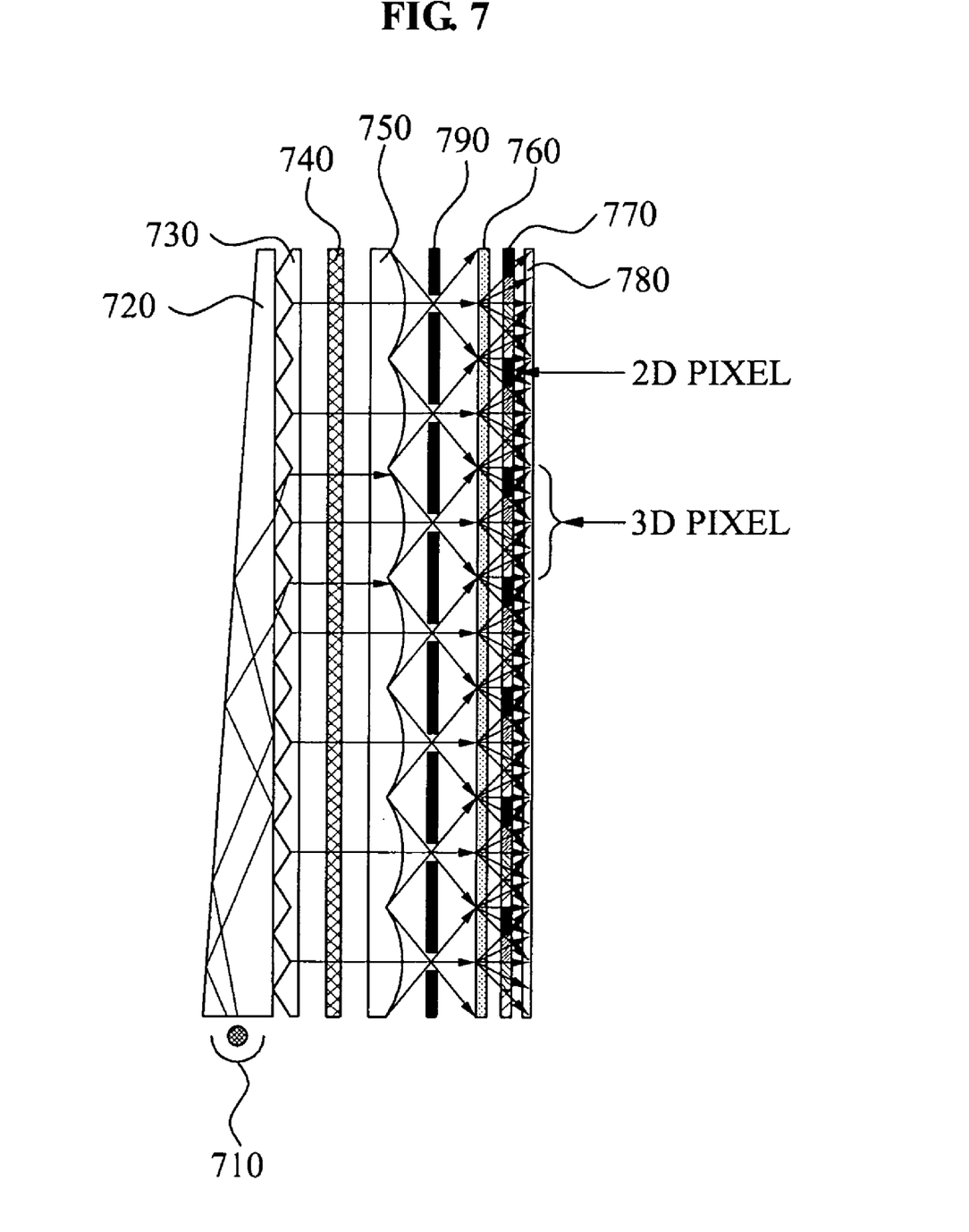
FIG. 7 is a diagram illustrating a detailed configuration of an image display apparatus according to yet another example embodiment.

FIG. 7 is a diagram illustrating a detailed configuration of an image display apparatus according to yet another example embodiment. Specifically, an example of the image display apparatus having the light source disposed on a side of the image display apparatus is illustrated in FIG. 7.

Here, the image display apparatus may include, for example, a light source 710, a light guidance unit 720 to guide a light projected from the light source, a light deflection filter 730, a light collimation unit 740, a lenticular lens 750, a field stop filter 790, a variable diffusion unit 760, a pixel unit 770, and a vertical diffusion unit 780.

Specifically, when the light source is disposed on a side of the image display apparatus, parallel beams may be generated using the light guidance unit 720 and the light deflection filter 730 for changing the light emitted from a light guidance plate into parallel beams. In this case, wedge-type optical glasses or optical plastics may be used as the light guidance plate, and an optical film for changing a light obliquely emitted from the light guidance plate into parallel beams may be used as the light deflection filter 730. Even in this case, locations of the variable diffuser 650 and pixel unit 660 may be interchanged with each other.

Figure 8:
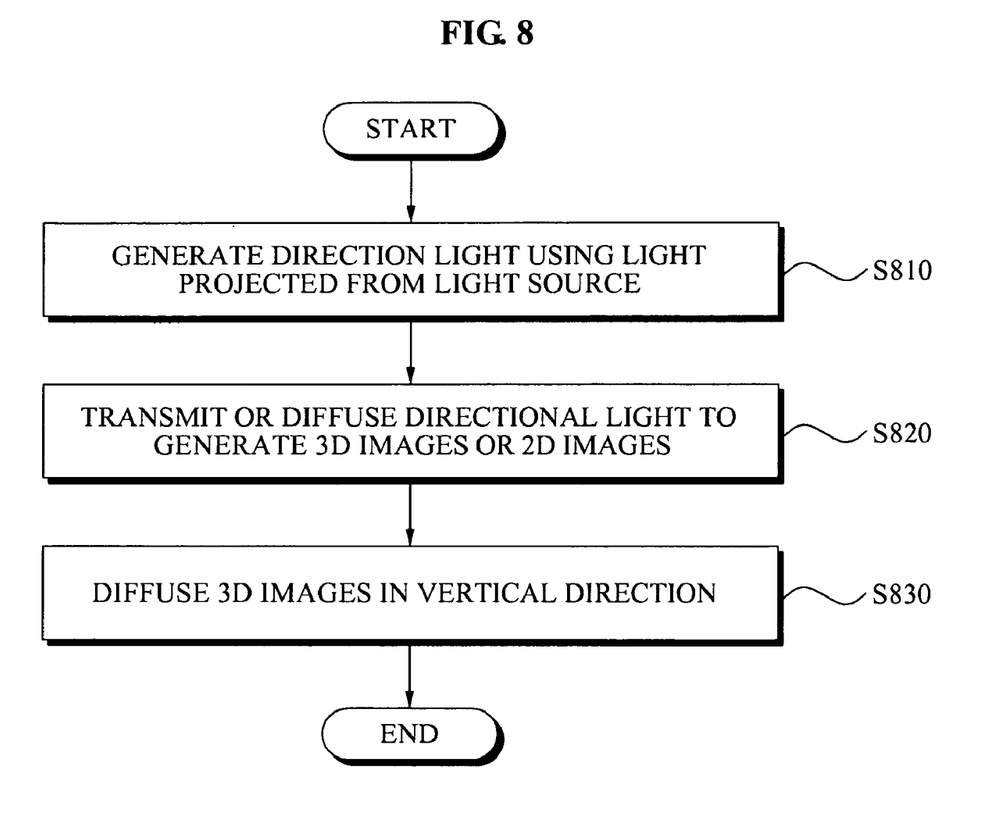
FIG. 8 is a flowchart illustrating an image display method according to an example embodiment.

FIG. 8 is a flowchart illustrating an image display method according to an example embodiment.

Referring to FIG. 8, in operation S810, the method according to the present example embodiment may generate a directional light using a light projected from a light source. Here, in operation S810, the method may generate parallel beams using the light projected from the light source, and may refract the parallel beams to generate a directional light. For example, the method may change a light radially emitted from the light source into first parallel beams using a Fresnel lens, change the first parallel beams into second parallel beams using a light collimation unit, and refract the second parallel beams to generate the directional light using a lenticular lens. Here, in operation S810, the method may further include an operation for blocking a light not passing through a focus of the lenticular lens from among lights refracted by the lenticular lens. For example, a field stop filter may be disposed on the focus of the lenticular lens, so that the light not passing through the focus of the lenticular lens is blocked from passing through the field stop filter, thereby generating a more precise directional light.

In operation S820, the method may transmit or diffuse the directional light to generate 2D images or 3D images. For example, the method may transmit or diffuse the directional light generated through the lenticular lens according to a change in a state of a variable diffuser to thereby generate the 2D images or the 3D images.

In operation S830, the method may diffuse the 3D images in a vertical direction. Specifically, the method may diffuse a light passing through the variable diffuser in the vertical direction. In this instance, when the variable diffuser is in a transparent state, the directional light may be directly transmitted, and may output a diffusion light in a vertical direction and the directional light in a horizontal direction. Also, when the variable diffuser is in a diffusing state, the directional light has already been totally diffused, so that the vertical diffusion unit may not perform any specific function.

Figure 9:
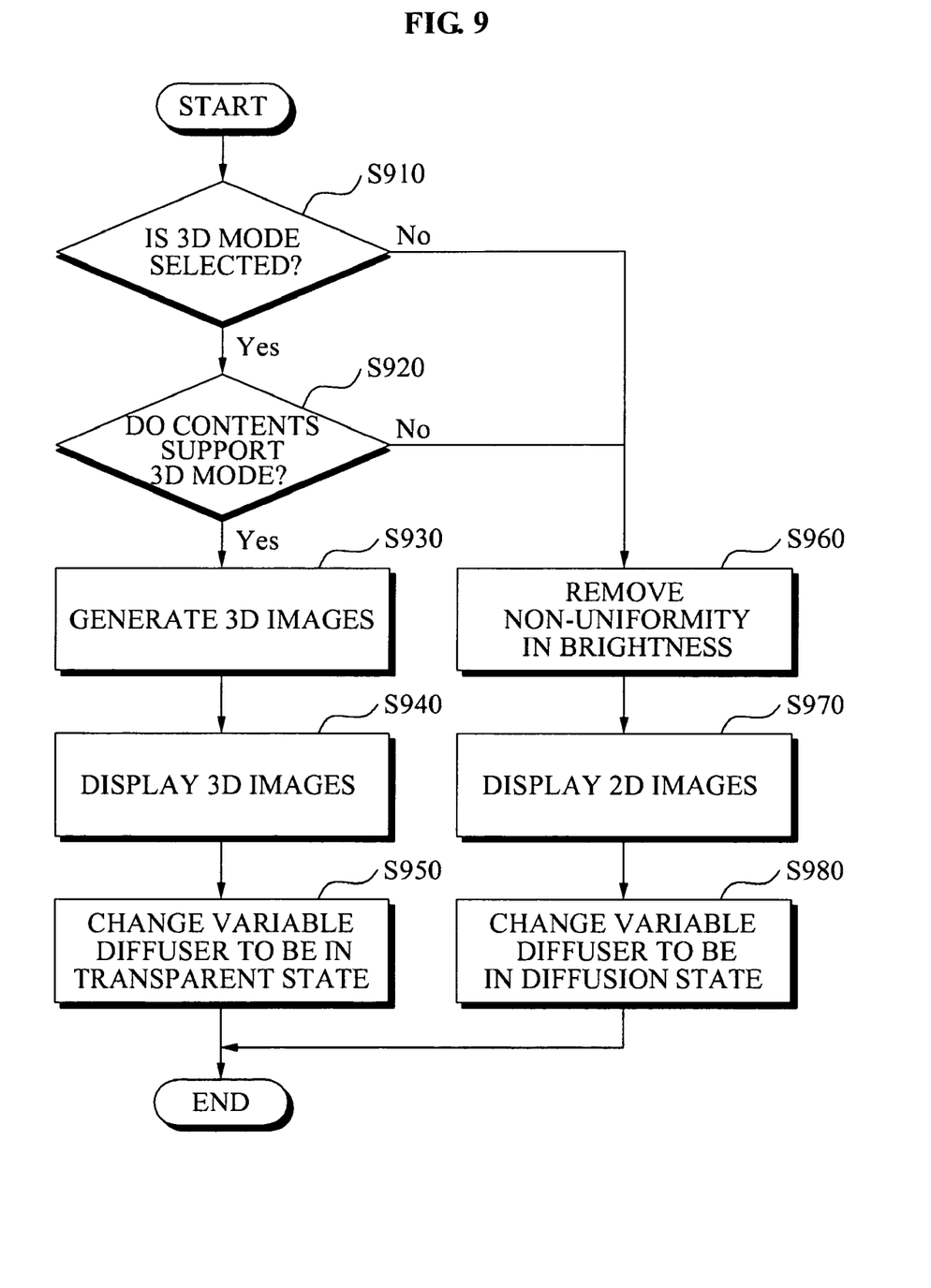
FIG. 9 is a flowchart illustrating an image display method according to another example embodiment.

FIG. 9 is a flowchart illustrating an image display method according to another example embodiment.

Referring to FIG. 9, in operation S910, the method may estimate whether a 3D mode is selected so as to output 2D images or 3D images. Specifically, when the 3D mode is selected through a user mode, 3D images may be outputted.

In operation S920, the method may determine whether contents support the 3D mode when the 3D mode is selected. When the contents do not support the 3D mode, the 2D images may be output.

In operation S930, the method may generate 3D images having directivity when the contents are determined to support the 3D mode. Here, the 3D images may be stereo-images or multi-view images.

In this instance, in operation S930, the method may further include an operation for generating parallel beams using a light projected from a light source, and an operation for refracting the parallel beams to generate a directional light.

In operation S940, the method may display the generated 3D images on a panel.

In operation S950, the method may apply power to the variable diffuser to change the variable diffuser to a transparent state, thereby enabling the user to view 3D images.

In operation S960, the method may remove non-uniformity in brightness of the 2D images when the 2D mode is selected in operation S910 or when the contents do not support the 3D mode in operation S920.

In operation S970, the method may display, on the panel, the 2D images from which the non-uniformity in brightness of the 2D images is removed.

In operation S980, the method may change the variable diffuser to be in a diffusing state to enable the 2D images to be viewed.

Figure 10:
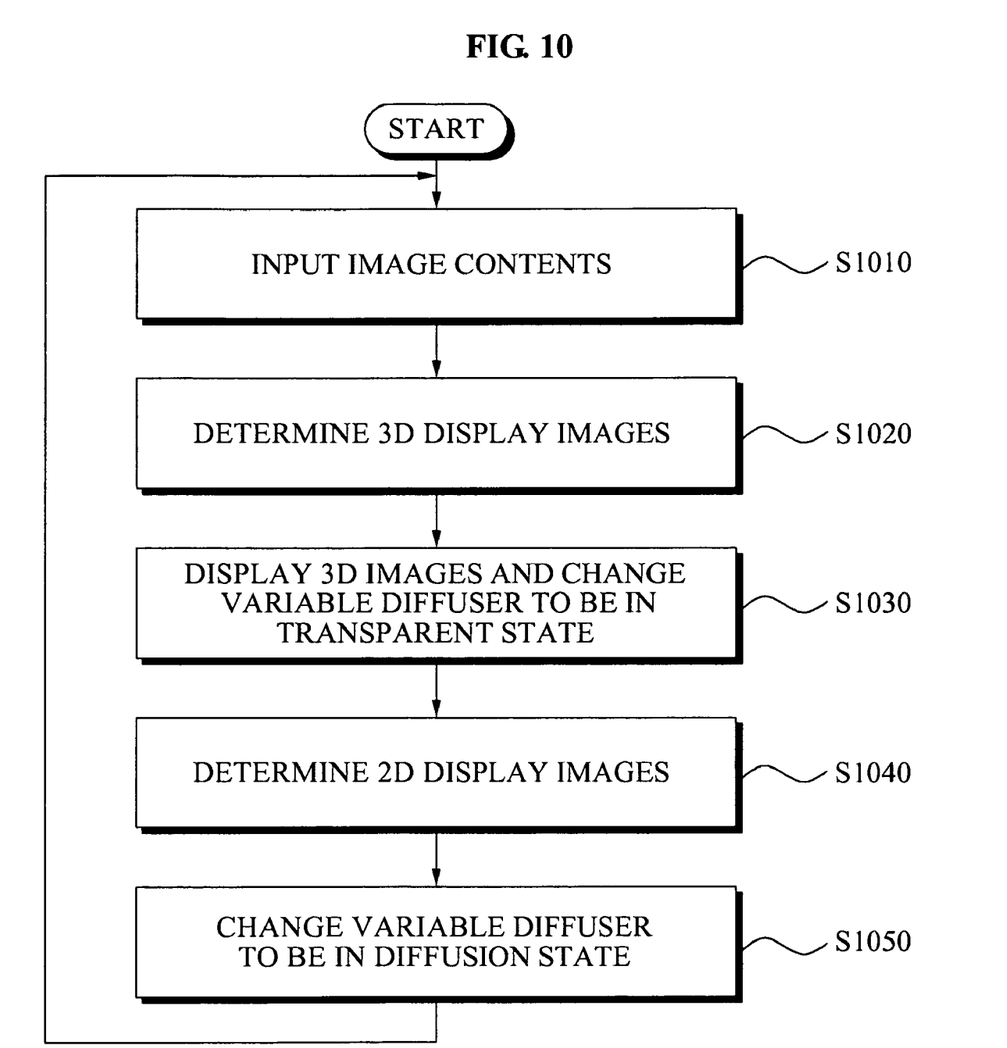
FIG. 10 is a flowchart illustrating an image display method for simultaneously displaying 3D and 2D images according to an exemplary embodiment.

FIG. 10 is a flowchart illustrating an image display method for simultaneously displaying 2D images and 3D images according to an exemplary embodiment.

Referring to FIG. 10, in operation S1010, the method according to the present example embodiment may receive image contents.

In operation S1020, the method may determine a region for displaying 3D images. In operation S1030, the method may display the 3D images, and change the variable diffuser to be in a transparent state. Also, in operation S1030, the method may determine a region for displaying 2D images. In operation S1040, the method may display the 2D images, and change the variable diffuser to be in a diffusing state. In this instance, the method may high-speed switch the variable diffuser, thereby simultaneously displaying the 2D images and the 3D images.

As described above, according to the example embodiments, a precise lens may be used without changing a shape of a lens, and 2D images or 3D images may be displayed using a variable diffuser, thereby reducing deterioration in image quality of the 2D images and the 3D images, and outputting high quality images.

According to the example embodiments, a variable diffuser that is easily manufactured may be used, thereby increasing mass-productivity of a system, and reducing costs.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An image display apparatus, comprising:
a light source unit to include at least one light source;
an optical unit to generate a directional light using a light projected from the light source unit;
a variable diffuser unit including a variable diffuser, wherein the variable diffuser unit controls the variable diffuser to selectively be in one of a transparent state and a diffusing state depending on a presence or absence of power to thereby selectively transmit and diffuse the directional light;
a pixel unit to selectively generate three-dimensional (3D) images and two dimensional (2D) images corresponding to the control of the variable diffuser by the variable diffuser unit;
a vertical diffusion unit to diffuse the 3D images in a vertical direction; and
a high-speed switching control unit to high-speed switch the variable diffuser between the transparent state and the diffusing state to control the 2D images and the 3D images to be simultaneously outputted.

2. The image display apparatus of claim 1, wherein the optical unit includes:
a parallel beam-generation unit to change the light projected from the light source unit into parallel beams; and
a directional light-generation unit to generate a directional light for generating 3D images,
wherein the optical unit is positioned between the light source unit and the pixel unit.

3. The image display apparatus of claim 2, wherein the parallel beam-generation unit includes:
a lens to change the light projected from the light source unit into first parallel beams; and
a light collimation unit to change the first parallel beams into second parallel beams.

4. The image display apparatus of claim 3, further comprising:

a field stop filter to block a light not passing through a focus of the lens, the field stop filter being positioned on the focus of the lens.

5. The image display apparatus of claim 3, wherein the lens uses any one of a Fresnel lens and a collimation lens depending on a number of light sources.

6. The image display apparatus of claim 2, further comprising:
a light guidance unit to guide the light projected from the light source when the light source is positioned at a side of a panel,
wherein the parallel beam-generation unit includes a light deflection filter to change a light projected from the light guidance unit into parallel beams.

7. The image display apparatus of claim 2, wherein the directional light-generation unit includes a lenticular lens for refracting the parallel beams to generate a directional light.

8. The image display apparatus of claim 1, wherein the variable diffuser unit selectively controls the variable diffuser to be in the transparent state by applying power to the variable diffuser when 3d images are to be output and to be in the diffusing state by removing power from the variable diffuser when 2d images are to be output.

9. The image display apparatus of claim 1, wherein the pixel unit is positioned at an opposite side of the light source with respect to the variable diffuser unit, and also the pixel unit generates 3D images when the variable diffuser directly transmits the directional light, and generates 2D images when the variable diffuser diffuses the directional light to generate a diffusion light.

10. An image display apparatus, comprising:
a light source unit to include at least one light source;
an optical unit to generate a directional light using a light projected from the light source unit;
a variable diffuser unit including a variable diffuser, wherein the variable diffuser unit controls the variable diffuser to selectively be in one of a transparent state and a diffusing state depending on a presence or absence of power to thereby selectively transmit and diffuse the directional light;
a pixel unit to selectively generate three-dimensional (3D) images and two dimensional (2D) images corresponding to the control of the variable diffuser by the variable diffuser unit; and
a high-speed switching control unit to high-speed switch the variable diffuser between the transparent state and the diffusing state to control the 2D images and the 3D images to be simultaneously outputted.

11. An image display apparatus, comprising:
a light source unit to include at least one light source;
an optical unit to generate a directional light using a light projected from the light source unit;
a variable diffuser unit including a variable diffuser, wherein the variable diffuser unit controls the variable diffuser to selectively be in one of a transparent state by applying power to the variable diffuser when three-dimensional (3D) images are to be output and a diffusing state by removing power from the variable diffuser when two-dimensional (2D) images are to be output;
a pixel unit to selectively generate the 3D images and the 2D images corresponding to the control of the variable diffuser by the variable diffuser unit; and
a vertical diffusion unit to diffuse the images in a vertical direction; and
a high-speed switching control unit to high-speed switch the variable diffuser between the transparent state and the diffusing state to control the 2D images and the 3D images to be simultaneously displayed.

12. The image display apparatus of claim 11, wherein the variable diffuser unit is positioned on an opposite side of the light source.

13. An image display method, comprising:
generating a directional light using a light projected from a light source;
selectively transmitting and diffusing the directional light depending on a presence or absence of power to a variable diffuser to thereby generate one of two-dimensional (2D) images and three-dimensional (3D) images corresponding to the transmitting and diffusing; and
determining a 2D image display area and a 3D image display area and high-speed switching the variable diffuser between the transparent state and the diffusing state to control the 2D image display area and the 3D image display area to be simultaneously displayed.

14. The image display method of claim 13, wherein the generating of the directional light includes:
generating parallel beams using the light projected from the light source, and
refracting the parallel beams to generate a directional light.

15. The image display method of claim 14, wherein the generating of the parallel beams changes the light projected from the light source to generate first parallel beams, and changes the first parallel beams to generate second parallel beams.

16. The image display method of claim 14, wherein the refracting of the parallel beams refracts the parallel beams using a lenticular lens.

17. The image display method of claim 16, further comprising:
blocking a light not passing through a focus of the lenticular lens.

18. The image display method of claim 13, wherein the selectively transmitting and diffusing the directional light selectively controls the variable diffuser to be in the transparent state by applying power to the variable diffuser when 3d images are to be output and to be in the diffusing state by removing power from the variable diffuser when 2d images are to be output.

19. An image display method, comprising:
determining whether a three-dimensional (3D) mode is selected;
determining whether contents support the 3D mode;
generating a directional light and controlling a variable diffuser to selectively be in one of a transparent state and a diffusing state depending on a presence or absence of power to thereby selectively transmit and diffuse the directional light;
selectively generating the 3D images and two dimensional (2D) images corresponding to the control of the variable diffuser;
high-speed switching the variable diffuser between a transparent state and the diffusing state to control the 2D images and the 3D images to be simultaneously displayed.

20. The image display method of claim 19, wherein the generating of the 3D images includes:
generating parallel beams using the light projected from the light source; and
refracting the parallel beams to generate a directional light.

21. The image display method of claim 19, further comprising:

removing non-uniformity in brightness of the 2D images, when a 2D mode is selected or the contents do not support the 3D mode;
displaying the 2D images on the image panel; and
changing the variable diffuser to be in the diffusing state to generate the 2D images.

* * * * *

UNITED STATES PATENT AND TRADEMARK OFFICE
CERTIFICATE OF CORRECTION

PATENT NO. : 8,144,390 B2  
APPLICATION NO. : 12/382684  
DATED : March 27, 2012  
INVENTOR(S) : Dong Kyung Nam et al.

Page 1 of 1

It is certified that error appears in the above-identified patent and that said Letters Patent is hereby corrected as shown below:

Column 9, Line 22, In Claim 8, delete "3d" and insert -- 3D --, therefor.

Column 9, Line 24, In Claim 8, delete "2d" and insert -- 2D --, therefor.

Column 10, Line 41, In Claim 18, delete "3d" and insert -- 3D --, therefor.

Column 10, Line 43, In Claim 18, delete "2d" and insert -- 2D --, therefor.

Signed and Sealed this
Third Day of July, 2012

David J. Kappos
*Director of the United States Patent and Trademark Office*